United States Patent [19]
Geary

[11] 3,979,128
[45] Sept. 7, 1976

[54] INTERFACE BUSHING FOR FLUID-TO-FLUID SHAFT SEAL ASSEMBLY

[75] Inventor: Carl H. Geary, Greensburg, Pa.

[73] Assignee: Carrier Corporation, Syracuse, N.Y.

[22] Filed: Oct. 3, 1975

[21] Appl. No.: 619,326

[52] U.S. Cl. .............................................. 277/75
[51] Int. Cl.² ........................................ F16J 15/44
[58] Field of Search .............................. 277/70–79, 277/81

[56] References Cited
UNITED STATES PATENTS

| | | | |
|---|---|---|---|
| 3,321,128 | 5/1967 | Fezer et al. | 277/81 |
| 3,484,113 | 12/1969 | Moore | 277/75 |
| 3,695,621 | 10/1972 | Damratowski et al. | 277/75 |

Primary Examiner—Robert I. Smith
Attorney, Agent, or Firm—J. Raymond Curtin; Thomas J. Wall

[57] ABSTRACT

A seal for use in a fluid-to-fluid shaft seal assembly as conventionally employed in a rotary machine. The seal includes a first and second ring encompassing the shaft and having a bushing seal interposed therebetween. A biasing member is arranged to act against one of the rings and the bushing seal to exert a predetermined force upon the bushing seal whereby the bushing seal is allowed to move radially in compliance with the shaft between the two rings. Radial ports are also provided within the bushing seal to bring fluid into contact with the shaft beneath the bushing, each port having a contoured entrance region to facilitate movement of fluid therethrough and thus insure that a positive seal is formed between the bushing and the shaft.

3 Claims, 2 Drawing Figures

INTERFACE BUSHING FOR FLUID-TO-FLUID SHAFT SEAL ASSEMBLY

BACKGROUND OF THE INVENTION

This invention relates to a bushing seal for use in a fluid-to-fluid shaft seal assembly and, in particular, to a shaft bushing seal arrangement for establishing a positive sealing interface between a sealing fluid and the working fluids contained within a rotary machine.

As disclosed in U.S. Pat. No. 3,695,621, to Damratowski, one prevalent method of sealing a shaft contained within a rotary machine against leakage is to provide a fluid sealing assembly between the shaft and the casing or end wall of the machine. The assembly basically includes a first shaft bushing confronting the working fluids contained within the machine and a series of pressure breakdown bushings aligned behind the front bushing. A high pressure sealing fluid is brought into contact with the shaft within the front bushing region to establish a fluid interface capable of preventing the working fluids from escaping from the machine. The pressure in the sealing fluid is periodically reduced or broken down as the fluid moves along the shaft beneath each of the breakdown bushings toward the low pressure side of the assembly. As can be seen, it is important in this type of sealing arrangement to establish a continuous and positive sealing interface at the front bushing to insure efficient seal performance.

Establishing and maintaining such a positive fluid-to-fluid interface has long been a problem in the art. Two primary factors are believed to contribute toward seal failure. The first involves the inability to properly mount and maintain the front seal within the assembly. The second factor is attributed to the incomplete formation of a fluid sealing barrier between the front seal and the shaft. The present invention is directed toward overcoming these shortcomings found in the art.

SUMMARY OF THE INVENTION

It is therefore an object of the present invention to facilitate the assembling and positioning of the front bushing seal within a fluid-to-fluid shaft seal assembly.

It is a further object of the present invention to establish a positive sealing interface between a high pressure sealing fluid contained within a shaft seal assembly and the working fluids contained within a rotary machine.

These and other objects of the present invention are attained in a fluid-to-fluid shaft seal assembly having a front seal bushing arranged to confront the working fluids contained within a rotary machine including a first and second ring encompassing the shaft and containing the bushing interposed therebetween, biasing means being adapted to act between one of the rings and the bushing and means to join the two rings in assembly whereby the bushing is biased between the rings with a force which allows the seal bushing to move radially in compliance with the shaft as the shaft deflects under load. The front seal bushing also is provided with radially extended ports in fluid flow communication with the sealing fluid, the ports being arranged to deliver the sealing fluid beneath the bushing so that it blankets the shaft. The ports are further provided with contoured inlets formed in the bushing which facilitate the flow of sealing fluid therethrough thus insuring that a positive seal is formed beneath the bushing under a wide range of operating conditions.

BRIEF DESCRIPTION OF THE DRAWINGS

For a better understanding of the present invention, as well as other objects and further features thereof, reference is had to the following detailed description of the invention to be read in connection with the accompanying drawings, wherein.

DESCRIPTION OF THE PREFERRED EMBODIMENT

Figure 1:
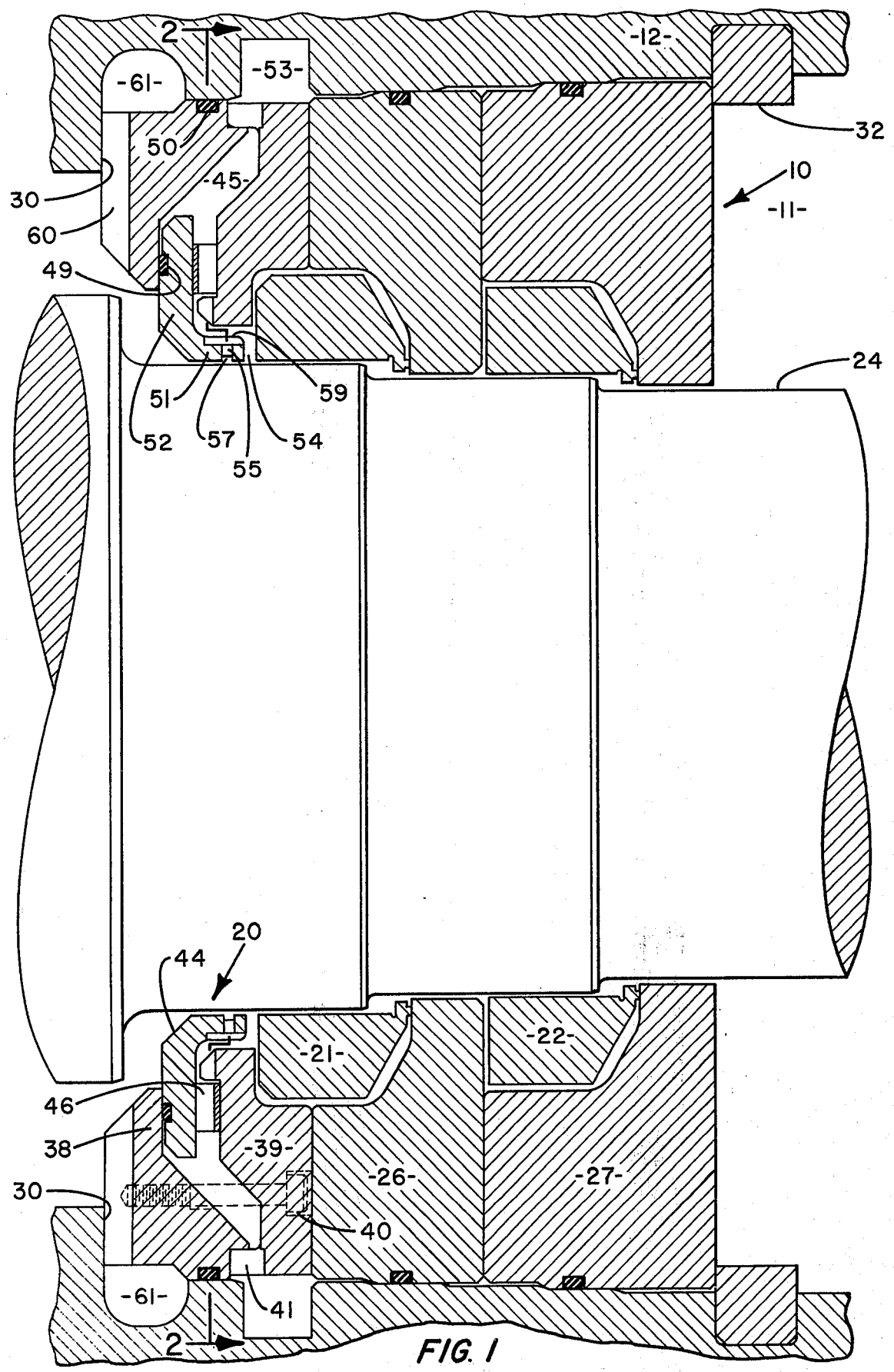
FIG. 1 is a partial plan view in section showing a shaft seal assembly embodying the teachings of the present invention with the seal assembly being mounted in the end wall of a rotary machine.

Referring now to the drawings, a fluid-to-fluid sealing assembly 10 is shown housed within a shaft opening 11 formed in the casing 12 of a rotary machine, such as a turbine or a compressor. As is typical in this type of high pressure machine, it is essential to effectively contain the pressurized fluids within the machine to insure efficient operation thereof. This, of course, necessitates sealing the shaft opening passing through the machine casing. The instant sealing assembly is adapted to establish a high pressure fluid barrier between the shaft and the casing which serves to prevent the working fluids from passing therebetween.

The sealing assembly includes a cartridge, generally referenced 20, confronting the working fluids contained within the machine and a series of pressure breakdown bushings 21, 22 aligned behind the cartridge in a direction facing the shaft opening. In practice, high pressure sealing fluid is brought into contact with the shaft 24 within the cartridge region to establish a fluid-to-fluid interface for restricting the passage of working fluids through the shaft opening. It should be understood that the pressure of the sealing fluid delivered into the cartridge region is maintained at a slightly higher pressure than the pressure of the working fluids so that an efficient barrier is created at the interface of the two fluids. A predominance of the sealing fluid moves along the shaft toward the low pressure side of the assembly and is caused to flow beneath each of the pressure breakdown bushings. A predetermined clearance is maintained between the cylindrical opening contained in each breakdown bushing and the shaft such that the bushings function as throttle points in regard to the sealing fluid for reducing the pressure within the flow stream. As a result, the pressure of the sealing fluid is throttled from an initially high sealing pressure at the seal interface to about atmospheric pressure as the fluid moves across the seal assembly.

Each of the breakdown bushings are housed within stators 26, 27 with the stators being sealed against the machine casing by conventional O-rings or the like. The stators and bushings are further pinned against rotation in assembly. In assembly, the cartridge is first passed over the shaft and seated in position against a lip 30 formed within the casing. The bushings and stators are then mounted upon the shaft and aligned behind the cartridge with the stators and cartridge in abutting contact as illustrated in FIG. 1. The entire assembly is then secured within the casing via shear key 32.

As best seen in FIG. 1, the cartridge is made up of a first drain ring 38 and a coacting second distributor ring 39 that are secured together in a face-to-face relationship by screws 40. The distributor ring is provided with a series of circumferentially spaced axially aligned embossments 41 in the outer periphery thereof which are received in complementary grooves formed in the drain ring. A generally annular-shaped seal bushing 44 is mounted within an annular flow channel 45 established between the two cojoined rings and is secured in place by a wave spring 46 arranged to act between one wall of the channel and the seal bushing body. A predetermined biasing pressure is exerted by the wave spring to hold the seal bushing within the cartridge. The pressure, however, is such as to permit the seal bushing to move radially in compliance with the shaft as the shaft deflects under load. An O-ring 49 is positioned between the seal bushing and the drain ring to prevent fluids from flowing therebetween. Similarly, the cartridge is sealed in relation to the machine casing by means of a second O-ring 50.

The seal bushing is located in assembly so as to confront the working fluids contained within the machine and functions primarily to establish a sealing interface between the sealing fluids and the working fluids. Structurally, the bushing consists of a cylindrical section 51 surrounding the shaft having a predetermined close running fit therewith, and a radially extended body section 52. The cylinder section of the bushing is dependent upon the body section that is carried upwardly into the flow channel 45. High pressure sealing fluid is delivered to an annular groove 53 formed within the machine casing which is in fluid flow communication with channel 45 formed in the cartridge. Sufficient clearance is provided within the channel by the openings between embossments 41 and by virtue of the wave spring contour to permit the sealing fluid to move in an unimpeded manner through the flow channel. The flow channel is arranged to discharge the high pressure sealing fluid over the backside of the cylindrical section of the bushing from where the fluid moves into contact with the shaft at the free end of the cylinder within a contact region 54.

Figure 2:
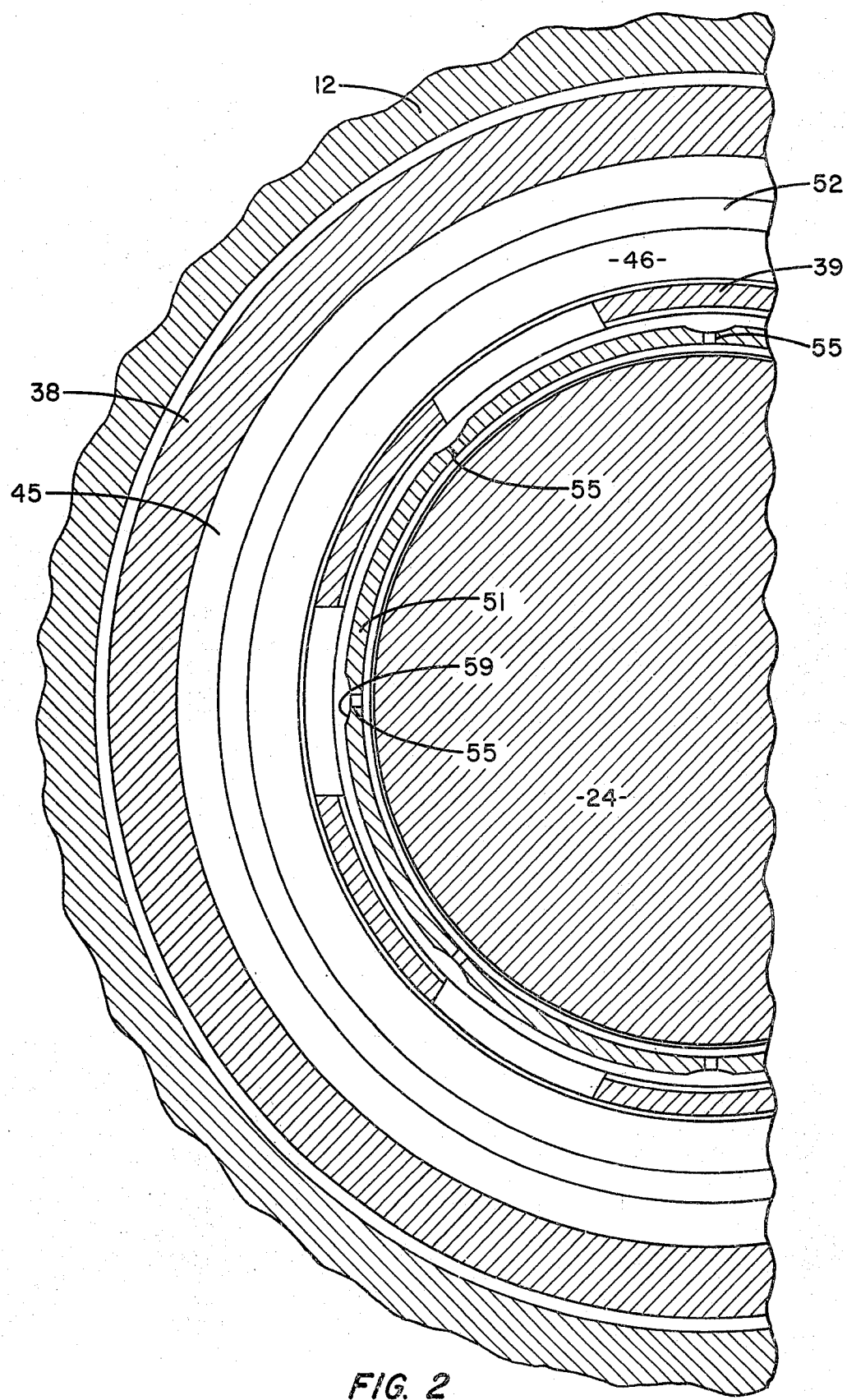
FIG. 2 is an enlarged view in section taken along line 2—2 in FIG. 1.

As best seen with reference to FIGS. 1 and 2, a series of radial ports 55 are formed in the body of the cylindrical section. The ports are arranged to bring sealing fluid into an annular groove 57 formed within the internal wall of the cylinder fronting the shaft. As the fluid moves over the cylinder, it flows through the ports into the annular groove and thus inundates the shaft with fluid beneath the cylindrical section. The fluid brought into contact with the shaft at the free end of the cylindrical section also tends to flow under the cylindrical section and thus combines with the port fed fluids to establish a continuous film of fluid beneath the shaft and the bushing to present a positive sealing interface to the working fluids. It has been found that adverse flow characteristics can be created as the fluid flow moves over the cylindrical section which, in turn, will impede the movement of fluid into the feed ports. To substantially eliminate this unwanted effect, arcuate-shaped grooves 59 are machined at the entrance to each port. The grooves are contoured to entrap a generous supply of fluid at each port entrance and to counteract the tendency of flowing fluid to create a vortex within this critical region.

Because the sealing fluid is at a slightly higher pressure than the fluid contained within the machine, some of the sealing fluid introduced beneath the cylindrical section will inadvertently move to the interior of the pressurized casing. This fluid is allowed to flow outwardly away from the shaft along drain channels 60 formed in the interior wall of the drain ring. The drain channel directs the fluid into a contaminant drain 61 from where it can be periodically purged from the machine.

While this invention has been described with reference to the structure herein disclosed, it is not confined to the details as set forth, and this application is intended to cover any modifications or changes as may come within the scope of the following claims.

What is claimed is:

1. An assembly for supporting a bushing seal within a rotary machine and establishing a positive fluid seal about the machine shaft to prevent working fluids from escaping about the shaft, the assembly including
   a first ring adapted to loosely encompass the shaft and being positionable to confront the working fluids located within the machine,
   a second ring also adapted to loosely encompass the shaft and being positioned behind said first ring in regard to the working fluids,
   said first and second rings having opposed contoured radially extended faces for providing an annular opening therebetween when said rings are brought into abutting contact,
   an annular bushing seal having a portion thereof adapted to encircle the shaft with a close running fit therebetween, said portion being dependent upon a radially extended arm arranged to pass upwardly into the annular opening formed between the two rings,
   means to secure the two rings in abutting contact with the bushing arm extending into the annular opening,
   a wave washer positioned between one wall of the annular opening and the radial arm of the bushing for exerting a perpendicular biasing force against the bushing arm to permit said bushing to move radially with the shaft as the shaft deflects under load when the rings are secured in abutting contact,
   means to bring a sealing fluid into the annular opening whereby the fluid is directed downwardly through said opening.

2. The assembly of claim 1 wherein the portion of said seal encircling the shaft is a cylinder having a series of radially extended ports passing therethrough, said ports being arranged in fluid flow communication with the sealing fluid directed through the annular opening between said rings, said cylinder further having cusps formed at the inlets to each of said ports to facilitate movement of sealing fluid into said ports.

3. The assembly of claim 1 wherein said first ring has a series of radially extended grooves formed in the end face thereof facing the working fluids contained within said rotary machine, said grooves being arranged to direct sealing fluid passing under the bushing into a collecting means.

* * * * *